United States Patent [19]

Morikawa et al.

[11] Patent Number: 5,776,483
[45] Date of Patent: Jul. 7, 1998

[54] FEED ADDITIVE FOR RUMINANTS

[75] Inventors: Takao Morikawa, Tougane; Seiji Sasaoka, Ichihara; Shigeru Saitoh, Ichihara; Masato Sugawara, Ichihara; Kaoru Mutoh, Sodegaura, all of Japan

[73] Assignee: Nippon Soda Co., Ltd., Tokyo, Japan

[21] Appl. No.: 793,128

[22] PCT Filed: Jun. 14, 1996

[86] PCT No.: PCT/JP96/01627

§ 371 Date: Feb. 4, 1997

§ 102(e) Date: Feb. 4, 1997

[87] PCT Pub. No.: WO97/00019

PCT Pub. Date: Jan. 3, 1997

[30] Foreign Application Priority Data

Jun. 15, 1995 [JP] Japan ................................ 7-172783
Nov. 8, 1995 [JP] Japan ................................ 7-314790

[51] Int. Cl.⁶ ............................................... A23K 1/00
[52] U.S. Cl. ................................. 424/438; 426/807
[58] Field of Search ......................... 426/807, 2, 69, 426/532, 623, 624, 630, 635; 424/438

[56] References Cited

U.S. PATENT DOCUMENTS

| | | | |
|---|---|---|---|
| 3,959,493 | 5/1976 | Baalsrud et al. | 424/438 |
| 4,642,317 | 2/1987 | Palmquist et al. | 514/558 |
| 4,798,737 | 1/1989 | Brunton et al. | 426/602 |
| 4,826,694 | 5/1989 | McAskie | 426/174 |

FOREIGN PATENT DOCUMENTS

| | | |
|---|---|---|
| 60-168350 | 8/1985 | Japan . |
| 63-313546 | 12/1988 | Japan . |
| 2-163043 | 6/1990 | Japan . |
| 3-31423 | 5/1991 | Japan . |
| 3-280840 | 12/1991 | Japan . |
| 3-280841 | 12/1991 | Japan . |
| 6-141785 | 5/1994 | Japan . |
| 2121268 | 12/1983 | United Kingdom . |

OTHER PUBLICATIONS

Sasaoka, S., "Feed Additive for Ruminant", Japanese Abstract No. 2-163043(A), Jun. 22, 1990.
Sasaoka, S., "Feed Additive for Ruminant", Japanese Abstract No. 2-163044(A), Jun. 22, 1990.

*Primary Examiner*—Neil S. Levy
*Attorney, Agent, or Firm*—Joseph C. Mason, Jr.

[57] ABSTRACT

The present invention has an object to provide an economically advantageous rumen bypass formulation capable of containing a biologically-active substance at a high concentration by means of using a protective material composted of safe natural product to ecosystem. The preparation of the rumen bypass formulation for ruminants according to the present invention can be accomplished by dispersing a biologically-active substance in an amount of from 50 to 90% by weight relative to the weight of the formulation into a protective material comprising specific salts of aliphatic carboxylic acid and either of fatty acid or aliphatic alcohol at a ratio of the former to the later being in a range of from 30:70 to 10:90.

10 Claims, No Drawings

FEED ADDITIVE FOR RUMINANTS

This application is a 371 of PCT/JP96/01627 filed Jun. 14,1996.

1. Field of the Invention

The present invention relates to a feed additive and, more particularly to a matrix-type rumen bypass formulation of feed additives wherein a biologically-active substance nutritiously useful for ruminants is dispersed in a protective material for protecting said biologically-active substance.

2. Background Art

A rumen bypass formulation for ruminants is defined as a formulation of feed additives which comprises one or more of amino acids, vitamins and other biologically-active substance and has a specific characteristic to allow elution and absorption of said biologically-active substance in digestive organs of ruminants from their fourth stomach onward while restricting elution and microbial decomposition of said substance in their rumen.

In breeding of ruminants, it is well accepted from dietetic and clinical point of view to feed them together with biologically-active substance contained in a rumen bypass formulation. In the practices, the incorporation of a biologically-active substance at high concentration to a rumen bypass formulation is advantageous and favorable, economically. Where, the hardness of the formulation is very important in view of durability to a mixing process with feeds and to chewing of cows. However, when increasing the concentration of biologically-active substance in the formulation, it is required to reduce the content of a protective material in the formulation, which has therefore made difficult to maintain rumen bypass property and hardness of the formulation. In order to solve this problem, a protective material having higher performance than the previous be inevitably required. Under the absence of such protective material, the concentration of a biologically-active substance in a matrix-type rumen bypass formulation has been obliged to be less than 50%.

The concept and many practical examples of the rumen bypass formulation has been already publicly known, however, there is no example for a matrix-type formulation which can contain a biologically-active substance at a high concentration of more than 50% (high concentrate formulation in the market). An example which uses salts of aliphatic monocarboxylic acids (fatty acids) as a protective material has been disclosed, however, no example which contains a biologically-active substance at a high concentration of more than 50% and can give good rumen bypass property, has not been disclosed.

In Japanese Patent Laid-opened No. Hei 2-163043, a concept for a matrix-type formulation which uses fatty acid salts and a fatty compound compatible to the salt as a protective material is disclosed, however, the concentration of a biologically-active substance contained therein is lower than 10%, and wherein no concrete description on the formulation containing more than 50% of the biologically-active substance, is given.

On the other hand, a example wherein both fatty acid calcium and stearyl alcohol were used as a protective material at a combining rate of 58:2 (97:3) is disclosed in International Patent Open No. WO/12731, however, the concentration of the biologically-active substance is yet lower than 50%.

In Japanese Patent Laid-opened No. Sho 56-154956, a matrix-type formulation which uses fatty protective material is disclosed, however, the content of the biologically-active substance is lower than 50% and the composition of the protective material is different from the one given in the present invention.

In U.S. Pat. No. 5,425,963, high purity fatty acid salt as a feed additive and the manufacturing method are disclosed, however, the object of that invention is different from that of the present invention and the content of the biologically-active substance is also far different from the one of the present invention.

Considering such difficulty existing in the prior arts, the present invention has an object to provide an economically advantageous rumen bypass formulation which can contain a biologically-active substance at a high concentration and is using safe natural materials to ecosystem, such as fats and oil, and wax, as the protective material.

DISCLOSURE OF THE INVENTION

The inventors of the present invention has previously disclosed a rumen bypass formulation comprising a biologically-active substance and using a protective material as the matrix composed of a fatty acid salt and a fatty compound compatible to the salt in WO/12731. Following thereto, the inventors of the present invention has further found that the composition of the protective material which can remain the concentration of a biologically-active substance in the formulation at high during its passage though rumen is quite different from the one capable of protecting the substance contained at a low concentration and is limited to a certain range, and that only a protective matrix comprising aliphatic monocarboxylic acid salt and either of aliphatic carboxylic acid or aliphatic alcohol, which are combined at a specific composition rate, can allow to prepare a rumen bypass formulation that can contain a biologically-active substance at a high concentration of more than 50%.

Therefore, the prevent invention is directed to a rumen bypass formulation for ruminants wherein biologically-active substances are dispersed at a range of from 50 to 90% by weight relative to the weight of the formulation in a protective material [I] as described below, of which content ranging from 10 to 50% by weight relative to the weight of the formulation.

The protective material [I] is composed of both compounds 1) and 2), and their combination ratio by weight of the compounds 1) to 2) is in a range of from 30:70 to 10:90.

Compound 1): the compounds are at a least one selected from a group consisting of a), b) and c) specified below.

a) Saturated or unsaturated aliphatic monocarboxylic acid containing 8–24 carbon atoms and being in either straight- or branched-chain.

b) Saturated or unsaturated aliphatic alcohol containing 8–24 carbon atoms and 1 hydroxy group, and being in either straight- or branched-chain.

c) Saturated or unsaturated di- or tri-carboxylic acid containing 2–8 carbon atoms in either straight- or branched-chain.

Compound 2): the salts of saturated or unsaturated aliphatic monocarboxylic acid containing 12–24 carbon atoms and being in either straight- or branched-chain.

Provided, a term, "% by weight", specified in the present invention means "% by dry weight", which is calculated based on a weight of a compound from which an amount of absorbed-water, that is water be eliminated from the compound by drying under ordinary temperature condition at a range of from 80° to 120° C., is subtracted.

The present invention is further described in detail in the following.

The biologically-active substance used in the present invention is defined as a substance which gives any biological activity when it is applied to ruminants, and is directed to a substance that is hard to be digested and absorbed efficiently by ruminants due to its easy decomposition in their rumen when it is administrated orally, such as amino acids including methionine and lysine hydrochloride, amino acid derivatives including 2-hydroxy-4-methylmercaptobutyric acid and the salts thereof, vitamins including nicotinic acid, nicotinic acid amide, vitamin A and vitamin E, saccharides including grape sugar and fruit sugar, various veterinary drugs including antibiotics and anthelmintics.

The biologically-active substance may be used either alone or in a combination of 2 or more of them for the rumen bypass formulation.

The amount in total of the biologically-active substance to be contained is in a range of from 50 to 90% by weight and, preferably in a range of from 60 to 85% by weight. It is less economical if the amount of the substance be less than this range, while the rumen bypass property deteriorates and the manufacturing of the formulation becomes difficult when the amount of the substance be more than this range.

The protective material used in the present invention substantially comprises a fatty acid salt and either of aliphatic (mono-, di- or tri-)carboxylic acid or aliphatic alcohol. The amount of the protective material to use is subjected to both of the amount of the biologically-active substance and that of a reforming agent that may be added when appropriate, but an adequate amount could be determined within a range of from 10 to 50% by weight. The fatty acid salt is called as "bypass fats and oil" as well, which has a property not to be decomposed in the rumen but to be digested in a digestive organs from the fourth stomach onward and is the main component of the protective material in the formulation. The amount of the fatty acid salt to use is in a range of from 70 to 90% by weight relative to the weight of the protective material. Out of this range, it is not possible to get a rumen bypass formulation which can contain a biologically-active substance at a high concentration and can assure excellent rumen bypass property.

The fatty acid salt used in the present invention is a salt of saturated or unsaturated aliphatic monocarboxylic acid containing 12–24 carbon atoms and being in either straight- or branched-chain. If the number of the carbon atoms is less than that range, the rumen bypass property of the formulation will be deteriorated, while digestion capability in digestive organs from the fourth stomach onward will decline when the number is more than that range. For the examples of said aliphatic monocarboxylic acid, lauric acid, palmitic acid, myristic acid, stearic acid, oleic acid, linoleic acid and linolenic acid are exemplified, and one or more of these aliphatic monocarboxylic acids can be used for the formulation. Particularly, a mixture of acids which are originated in animals or plants, such as fatty acids obtained from palm oil or beef tallow, is preferable in view of commercial availability.

For the examples of the fatty acid salts, calcium salts, magnesium salts, aluminium salts and zinc salts of aliphatic monocarboxylic acids containing carbon atoms in a range described above are exemplified, however, it is preferable to use any one of the calcium salts.

In the present invention, it is preferable to use a highly purified fatty acid salt, of which purity in the solid component (hereinafter abbreviated as "the purity") be preferably more than 90%. The purity used here is defined as the proportion of insoluble residue obtained after an extraction of the fatty acid salt according to a customary analytical method for fats and oil with a solvent, such as ethers and ketones, which is calculated by subtracting the amount of absorbed water therefrom. In this extraction, however, it is necessary to use a solvent which does not dissolve the fatty acid salt but can dissolve fats and oil contained in the salt.

It is preferable that the amount of a base, such as calcium, contained in the fatty acid salt can remain at a level approximately equivalent or excess in term of physical property, such as hardness. In case that the base is calcium salt, it is preferable to contain the base at a rate of 7–12% by weight as a content of calcium, and preferably 8–10% by weight. For the quantitative analysis of calcium, a known analytical method can be employed, however, the quantity of calcium is normally determined by incinerating the fatty acid salt and consequently analysing the amount of calcium contained in the ash obtained.

Fatty acids obtained from beef tallow and palm oil, which are usable as a raw material for the fatty acid salt, normally contain triglycerides at a rate ranging from 5 to 40%, and other compounds, such as reaction controlling agents and stabilizers, are further added thereto sometime. These compounds may remain in the reacted-product of fatty acid salt as unreacted components and those become the impurities for the fatty acid salt. Some of the fatty acid salts commercially available contain more or less 20% of impurities. In the highly concentrated formulation, such impurities work to deteriorate the rumen bypass property and the hardness of the formulation, and therefore, it is preferable to use highly-purified fatty acid salts.

Aliphatic carboxylic acids and aliphatic alcohols used as the protective material of the present invention together with said fatty acid salt are considered as a component to improve the compatibility between the biologically-active substance and the protective matrix as well as a component to reduce the degree of crystallization of the fatty acid salt, and it is preferable to use these carboxylic acids and alcohols at a rate compatible to the fatty acid salt. Concerning the melting point of these carboxylic acids and alcohols, there is a tendency that the melting point is preferably close to ruminant's body temperature. The amount range to incorporate these carboxylic acid or alcohol in the formulation is between 10 to 30% by weight relative to the weight of the protective material. Out of this range, it is difficult to prepare the formulation while assuring good rumen bypass property.

The number of carbon atoms contained in aliphatic monocarboxylic acids used in the present invention is in a range of from 8 to 24, and preferably from 12 to 18. If using the acid containing less carbons, the formulation becomes soft and it deteriorates the rumen bypass property, while the digestion capability in digestive organs from the fourth stomach onward deteriorate when using the acid containing carbon atoms more than that range.

For the examples of said aliphatic monocarboxylic acids, caprylic acid, capric acid, lauric acid, myristic acid, palmitic acid, palmitoleic acid, stearic acid, oleic acid, linoleic acid, linolenic acid, behenic acid, hydrogen-added fatty acid of castor oil, and the mixture thereof, are exemplified. Most of the aliphatic monocarboxylic acids commercially available are saponificated and purified oil originated from animals or vegetables.

The number of carbon atoms contained in the monovalent aliphatic alcohol having one hydroxy group used in the present invention is preferably in a range of from 8 to 24, and more preferably from 12 to 18, since the softening of the formulation and a decline in rumen bypass property are recognized when the alcohols having less carbon atoms than that range, while deterioration in degree of digestion in digestive organs from the fourth stomach onward is observed when the alcohols having carbon atoms more than that range.

For the examples of the aliphatic alcohols used in the present invention, octanol, nonanol, dekanol, undekanol, lauryl alcohol, myristic alcohol, cetyl alcohol, stearyl alcohol, eicosanol, docosanol, dodecenol, fiseteryl alcohol, zoomaryl alcohol, oleyl alcohol, gadoleyl alcohol and the isomers thereof, are exemplified.

The number of carbon atoms of the aliphatic di- or tri-carboxylic acids (having 2 to 3 carboxyl groups) used in the present invention is preferably in a range of from 2 to 8, and more preferably from 2 to 6, and it is difficult to prepare the formulation having good physical property with the acid containing carbon atoms out of that range.

For the examples of the said aliphatic di- or tri-carboxylic acids, oxalic acid, malonic acid, succinic acid, glutaric acid, adipic acid, pimelic acid, suberic acid, malic acid, citric acid, and the like are exemplified.

In the present invention, wax, such as rice wax, carnauba wax and beeswax, ethyl cellulose, propyl cellulose, polyethylene, chitosan and their derivatives, various polymers such as pH-sensitive polymers, powder of organic and inorganic materials, and various additives, such as stabilizers and perfumes, can be added to the formulation as an improving agent for any of the formulation-forming property, the mechanical intensity and other properties when appropriate. In addition, it is also possible to improve the property of the formulation by coating it with such improving agents.

For the manufacturing of the rumen bypass formulation specified in the present invention, various known methods for granulation can be employed. However, it is preferable to employ extruding granulation method, and wherein it is further preferable to respectively subject the formulation to quenching treatment immediately after both processes of evacuation and granulation by using either water or cool wind in order to obtain a formulation of less voids and less water content.

Although there is no limitation in the shape of the formulated product to manufacture, it is preferable to make it into granules with less corners, namely, any of globular, elliptic, cannonball-shaped, and cylindrical shapes. Regarding the size of the formulated product, any size appropriate for the use as feeds can be selected, however, it is preferable to select a size in a range of 0.5 to 10 mm in both diameter and length, which are classified into a standard category of granules or pellets.

BEST MODE FOR CARRYING OUT THE INVENTION

The present invention is further described in detail with referring to the following embodiments and examples for comparison.

However, the scope of the present invention should not be limited to the description given in the following embodiments.

EXAMPLE 1

28 parts by weight of calcium salt of beef tallow fatty acid (purity: 97.3%), 7 parts by weight of palmitic acid and 65 parts by weight of methionine were mixed. The mixture was placed in a hopper of a double-shaft extruding granulator and was extruded in fused state through a die with a diameter of 2 mm while subjecting it to evacuation.

Then, the mixture extruded was cut with a water-cooled cutter, dehydrated by using a centrifuge, and dried by blowing at room temperature to thereby obtain a rumen bypass formulation in approximately cylindrical shape having an average diameter of 2 mm and an average length of 2 mm.

EXAMPLE 2

28 parts by weight of calcium salt of beef tallow fatty acid (purity: 97.3%), 5 parts by weight of lauric acid and 70 parts by weight of methionine were mixed. The mixture was placed in a hopper of a double-shaft extruding granulator and was extruded in fused state through a die with a diameter of 1.2 mm while subjecting it to evacuation. Then, the mixture extruded was cut with a water-cooled cutter to obtain a formulated product in cannonball shape having an average maximum diameter of 1.2 mm and an average length of 1.2 mm. After subjecting it to a centrifuge, 100 parts by weight of the formulated product and 1 part by weight of powder talc were mixed, and the mixture was then placed in an oven maintained at 60° C. to dry it for 16 hours, thereby a desired rumen bypass formulation was obtained.

EXAMPLE 3

23 parts by weight of calcium salt of beef tallow fatty acid (purity: 97.3%), 4 parts by weight of lauric acid, 71 parts by weight of methionine and 1 part by weight of ethyl cellulose were mixed. The mixture was placed in a hopper of a double-shaft extruding granulator and was extruded in fused state through a die with a diameter of 1.6 mm while subjecting it to evacuation. Then, the mixture extruded was cut with a water-cooled cutter to obtain a formulated product in approximately cylindrical shape having an average diameter of 1.6 mm and an average length of 1.6 mm. After subjecting it to a centrifuge, the formulated product was dried at 40° C. for 16 hours to thereby obtain a desired rumen bypass formulation.

EXAMPLE 4

32 parts by weight of calcium salt of palm fatty acid (purity: 97.1%), 5 parts by weight of myristic acid, 62.5 parts by weight of methionine and 0.5 part by weight of vitamin E acetate were mixed. The mixture was placed in a hopper of a double-shaft extruding granulator and was extruded in fused state through a die with a diameter of 1.2 mm while subjecting it to evacuation. Then, the mixture extruded was cut with a water-cooled cutter to obtain a formulated product in approximately cylindrical shape having an average diameter of 1.2 mm and an average length of 1.2 mm. To the formulated product, 1 part by weight of bone meal was then added, and the mixture was slowly passed for 40 min. through a rotating kirn maintained at 50° C. The mixture was then cooled by blowing to room temperature, thereby a desired rumen bypass formulation was obtained.

EXAMPLE 5

20 parts by weight of calcium salt of palm fatty acid (parity: 94.0%), 4 parts by weight of lauric acid, 1 part by weight of glyceryl monostearate, 65 parts by weight of methionine and 10 parts by weight of lysine hydrochloride were mixed. The mixture was placed in a hopper of a double-shaft extruding granulator and was extruded in fused state through a die with a diameter of 1.2 mm while subjecting it to evacuation. Then, the mixture extruded was cut with a water-cooled cutter to obtain a formulated product in approximately cylindrical shape having an average diameter of 1.2 mm and an average length of 1.2 mm. The formulated product was then slowly passed for 50 min. through a rotating kirn maintained at 50° C., and was cooled by blowing to room temperature, to thereby obtain a desired rumen bypass formulation.

EXAMPLE 6

22 parts by weight of calcium salt of beef tallow fatty acid (purity: 97.3%), 6 parts by weight of stearyl alcohol, 1 part by weight of carnauba wax and 73 parts by weight of methionine were mixed. The mixture was placed in a hopper of a double-shaft extruding granulator and was extruded in fused state through a die with a diameter of 1.2 mm while subjecting it to evacuation. Then, the mixture extruded was cut with a water-cooled cutter to obtain a formulated product in approximately cylindrical shape having an average diameter of 1.2 mm and an average length of 1.2 mm. After subjecting it to a centrifuge, the formulated product was dried in an oven maintained at 40° C. for 16 hours to thereby obtain a desired rumen bypass formulation.

EXAMPLE 7

29 parts by weight of calcium salt of palm fatty acid (purity: 97.1%), 6 parts by weight of cetyl alcohol and 65 parts by weight of methionine were mixed. The mixture was placed in a hopper of a double-shaft extruding granulator and was extruded in fused state through a die with a diameter of 2 mm while subjecting it to evacuation. Then, the mixture extruded was cut with a water-cooled cutter, dehydrated by using a centrifuge, and dried by blowing at room temperature to thereby obtain a desired rumen bypass formulation in cannonball shape having an average diameter of 2 mm and an average length of 2 mm.

EXAMPLE 8

29 parts by weight of calcium salt of beef tallow fatty acid (purity: 97.3%), 3 parts by weight of lauryl acid, 3 parts by weight of palmitic acid and 65 parts by weight of methionine were mixed. The mixture was placed in a hopper of a double-shaft extruding granulator and was extruded in fused state through a die with a diameter of 2 mm while subjecting it to evacuation. Then, the mixture extruded was cut with a water-cooled cutter, dehydrated by using a centrifuge, and dried by blowing at room temperature to thereby obtain a desired rumen bypass formulation in cannonball shape having an average diameter of 2 mm and an average length of 2 mm.

EXAMPLE 9

29 parts by weight of calcium salt of palm fatty acid (purity: 97.1%), 4 parts by weight of myristic acid, 2 parts by weight of succinic acid and 65 parts by weight of methionine were mixed. The mixture was placed in a hopper of a double-shaft extruding granulator and was extruded in fused state through a die with a diameter of 2 mm while subjecting it to evacuation. Then, the mixture extruded was cut with a water-cooled cutter, dehydrated by using a centrifuge, and dried by blowing at room temperature to thereby obtain a desired rumen bypass formulation in cannonball shape having an average diameter of 2 mm and an average length of 2 mm.

EXAMPLE FOR COMPARISON 1

35 parts by weight of calcium salt of beef tallow fatty acid (purity: 97.3%) and 65 parts by weight of methionine were mixed. The mixture was placed in a hopper of a double-shaft extruding granulator and was extruded in fused state through a die with a diameter of 2 mm while subjecting it to evacuation. Then, the mixture extruded was cut with a water-cooled cutter, dehydrated by using a centrifuge, and dried by blowing at room temperature to thereby obtain a desired rumen bypass formulation in approximately cylindrical shape having an average diameter of 2 mm and an average length of 2 mm.

EXAMPLE FOR COMPARISON 2

20 parts by weight of calcium salt of beef tallow fatty acid (purity: 97.3%), 15 parts by weight of stearic acid and 65 parts by weight of methionine were mixed. The mixture was placed in a hopper of a double-shaft extruding granulator and was extruded in fused state through a die with a diameter of 2 mm while subjecting it to evacuation. Then, the mixture extruded was cut with a water-cooled cutter, dehydrated by using a centrifuge, and dried by blowing at room temperature to thereby obtain a desired rumen bypass formulation in approximately cylindrical shape having an average diameter of 2 mm and an average length of 2 mm.

EXAMPLE FOR COMPARISON 3

20 parts by weight of calcium salt of palm fatty acid (purity: 94.0%), 5 parts by weight of glyceryl monostearate, 65 parts by weight of methionine and 10 parts by weight of lysine hydrochloride were mixed. The mixture was placed in a hopper of a double-shaft extruding granulator and was extruded in fused state through a die with a diameter of 1.2 mm while subjecting it to evacuation. Then, the mixture extruded was cut with a water-cooled cutter, dehydrated by using a centrifuge, and dried by blowing at room temperature to thereby obtain a desired rumen bypass formulation in approximately cylindrical shape having an average diameter of 1.2 mm and an average length of 1.2 mm.

EXAMPLE FOR COMPARISON 4

28 parts by weight of calcium salt of palm fatty acid (purity: 94.0%), 2 parts by weight of stearyl alcohol and 70 parts by weight of methionine were mixed. The mixture was placed in a hopper of a double-shaft extruding granulator and was extruded in fused state through a die with a diameter of 1.2 mm while subjecting it to evacuation. There, the mixture extruded was cut with a water-cooled cutter, dehydrated by using a centrifuge, and dried by blowing at room temperature to thereby obtain a desired rumen bypass formulation in cannonball shape having an average diameter of 1.2 mm and an average length of 1.2 mm.

Evaluation on the Formulation Purity of Fatty Acid Salt

The formulation was subjected to reflux extraction with acetone for 8 hours by using a Soxhlet extractor. The purity of fatty acid salt in the formulation was calculated from the difference in the dry weight measured before and after the reflux extraction.

Concentration of Calcium contained in Fatty Acid Salt

After incinerating 1 g of fatty acid salt at 550° C., the ash obtained was dissolved in hydrochloric acid, diluted and quantitatively analyzed by using emission spectrochemical analyzer (ICP) to determine calcium concentration in the fatty acid salt relative to the dry weight of said fatty acid salt.

Hardness

The hardness of the formulation was measured by using a measurer for the hardness of tablets. The hardness was expressed with a value of loading pressure at which the formulation starts to destroy.

The performance of the formulation was also evaluated based on its solubility in imitative solutions as described below maintained at 40° C. by dipping the formulation into each of the solutions in turn.

Eluting Ratio in the First Stomach

This ratio is to evaluate eluting property of the formulation in the first stomach of cows, and which is a ratio of the amount of a biologically-active substance, that eluted into the imitative gastric juice of the first stomach when the formulation was dipped while shaking for 16hours in the said gastric juice prepared at a pH value of 6.4, relative to the amount of the biologically-active substance originally contained in the formulation.

Eluting Ratio in the Fourth Stomach

After measured the eluting ratio in the first stomach, the solid product obtained was separated and consequently dipped into imitative gastric juice of the fourth stomach of cows prepared at a pH value of 2.0. After 2 hours shaking, the ratio of the amount of the biologically-active substance eluted into the gastric juice relative to the amount of the biologically-active substance originally contained in the formulation was determined to evaluate the elution property of the formulation in the fourth stomach.

Eluting Ratio in Gastric Juice of Small Intestine

After measured the eluting ratio in the fourth stomach, the solid product obtained was separated and consequently dipped into imitative gastric juice of small intestine of cows prepared at a pH value of 8.2.

After 4 hours shaking, the ratio of the amount of the biologically-active substance eluted into the gastric juice relative to the amount of the biologically-active substance originally contained in the formulation was determined to evaluate the elution property of the formulation in small intestine.

Imitative Gastric Juice of the First Stomach

This imitative solution is to substitute gastric juice of the first stomach of cows, which is prepared by dissolving 2.5 g of disodium hydrogenphosphate and 6.7 g of dipotassium hydrogenphosphate into water and then adjusting the volume with water to a final volume of 1 l, and of which pH value is 6.4.

Imitative Gastric Juice of the Fourth Stomach

This imitative solution is to substitute gastric juice of the fourth stomach of cows, which is prepared by adding 50 ml of 3.2-N potassium chloride and 10 ml of 0.2-N hydrochloric acid to water and then adjusting the volume with water to a final volume of 200 ml, and of which pH value is 2.0.

Imitative Gastric Juice of Small Intestine

This imitative solution was prepared by dissolving 9.8 g of sodium hydrogencarbonate, 0.57 g of potassium chloride, 9.30 g of disodium phosphate $12H_2O$, 0.47 g of sodium chloride, 0.12 g of sodium sulfate heptahydrate, 0.05 g of cow bile powder and 0.05 g of lipase in water and consequently adjusting the volume with water to a final volume of 1 l, and of which pH value is 8.2.

TABLE 1

Results in Evaluation of Eluting Ratio

| | Example 1 | Example 2 | Example 3 | Example 4 | Example 5 | Example 6 | Example 7 | Example 8 | Example 9 |
|---|---|---|---|---|---|---|---|---|---|
| Details of Formulation | | | | | | | | | |
| Shape | Cylindrical | Cannonball | Cylindrical | Cylindrical | Cylindrical | Cylindrical | Cylindrical | Cannonball | Cylindrical |
| Outer Diameter-Length (mm) | 2.0—2.0 | 1.2—1.2 | 1.6—1.6 | 1.2—1.2 | 1.2—1.2 | 1.2—1.2 | 2.0—2.0 | 2.0—2.0 | 2.0—2.0 |
| Biologically-Active Substance | | | | | | | | | |
| Substance | Methionine | Methionine | Methionine | Methionine/ Vitamin E | Methionine/ Lysine salt | Methionine | Methionine | Methionine | Methionine |
| Conc. (5) | 65 | 70 | 71 | 62.5/0.5 | 65/10 | 73 | 65 | 65 | 65 |
| Hardness | 330 | 350 | 290 | 340 | 330 | 300 | 350 | 370 | 340 |
| Protective Material | | | | | | | | | |
| Aliphatic carboxylic acid (1) | Palmitic acid | Lauric acid | Palmitic acid | Myristic acid | Lauric acid | | | Lauric acid Palmitic acid | Myristic acid Succinic acid |
| Aliphatic alcohol | | | | | | Stearyl alcohol | Cetyl alcohol | | |
| Fatty Acid Ca salt (2) | | | | | | | | | |
| Raw Material Fatty Acid | Beef suet | Palm oil | Beef suet | Palm oil | Palm oil | Beef suet | Palm oil | Beef suet | Palm oil |
| Concentration of Ca | 8.3 | 7.4 | 8.3 | 7.9 | 7.4 | 8.3 | 7.9 | 8.3 | 7.9 |
| Purity (%) | 97.3 | 94.0 | 97.3 | 97.1 | 94.0 | 97.3 | 97.1 | 97.3 | 97.1 |
| Ratio (1):(2) | 20:80 | 17:83 | 15:85 | 14:86 | 17:83 | 21:79 | 17:83 | 17:83 | 17:83 |
| Eluting Ratio | | | | | | | | | |
| a) In First Stomach (%) 16 H | 8 | 9 | 10 | 5 | 12 | 14 | 13 | 10 | 8 |
| b) In Fourth Stomach (%) 2 H | 11 | 23 | 10 | 55 | 43 | 30 | 31 | 15 | 21 |
| c) In Small Intestine (%) 4 H | 66 | 58 | 60 | 28 | 31 | 45 | 43 | 58 | 57 |

TABLE 2

Results in Evaluation of Eluting Ratio
(Examples for Comparison)

| | Example for Comparison 1 | Example for Comparison 2 | Example for Comparison 3 | Example for Comparison 4 |
|---|---|---|---|---|
| Details of Formulation | | | | |
| Shape | | Cylindrical | | Cannonball |
| Outer Diameter-Length (mm) | 2.0—2.0 | 2.0—2.0 | 1.2—1.2 | 1.2—1.2 |
| Biologically-Active Substance | | | | |
| Substance | Methionine | Methionine | Methionine/Lysine salt | Methionine |
| Conc. (5) | 65 | 65 | 65/10 | 70 |
| Hardness | 300 | 280 | 270 | 300 |
| Protective Material | | | | |
| Aliphatic carboxylic acid (1) | | Stearic acid | | |
| Aliphatic alcohol | | | | Stearyl alcohol |
| Fatty Acid Ca salt (2) | | | | |
| Raw Material Fatty Acid | Beef suet | Beef suet | Palm oil | Palm oil |
| Concentration of Ca | 8.3 | 8.3 | 7.4 | 7.4 |
| Purity (%) | 97.3 | 97.3 | 94.0 | 94.0 |
| Ratio (1):(2) | 0:100 | 43:57 | 0:100 | 7:93 |
| Eluting Ratio | | | | |
| a) In First Stomach (%) 16 H | 86 | 97 | 57 | 71 |
| b) In Fourth Stomach (%) 2 H | 2 | 1 | 15 | 5 |
| c) In Small Intestine (%) 4 H | 10 | 1 | 17 | 9 |

Application for Industrial Use

As can be seen from the results shown in Table 1, the eluting ratio of the rumen bypass formulation each prepared in the examples from 1 to 9 was low in the imitative gastric juice of the first stomach, respectively, while the sum of the eluting ratio of the said formulation in both gastric juice of the fourth stomach and small intestine was high, respectively. The results show an excellent bypass property of these formulations in the first stomach and that the formulations can be easily digested in digestive organs from the fourth stomach onward.

Whereas, in Table 2, the formulation prepared according to the referential example 1, for which only aliphatic mono-carboxylic acid was used as a protective material, and all formulations prepared according to the Examples for Comparison 2, 3 and 4, for which a protective material out of the scope of the present invention was used, respectively, showed high eluting ratio in gastric juice of the first stomach and are inferior in rumen bypass property, and it is demonstrated that those are less useful practically.

As such, by using protective material comprising a fatty acid salt and either of an aliphatic carboxylic acid or a monovalent aliphatic alcohol at certain specific composition ratio, a matrix-type rumen bypass formulation containing a biologically-active substance at a high concentration of more than 50% and having excellent rumen bypass property, can be prepared.

What is claimed is:

1. A rumen bypass formulation which comprises (A) 50 to 90% by weight of a biologically active substance; dispersed in (B) 10 to 50% by weight of a protective material, wherein the protective material comprises (1) a compound selected from the group consisting of components (a), (b), (c), and a mixture thereof, and (2) a compound which is a salt of an aliphatic monocarboxylic acid containing 12 to 24 carbon atoms, where (a) is an aliphatic monocarboxylic acid having 8 to 24 carbon atoms, (b) is an aliphatic alcohol having one hydroxy group and having 8 to 24 carbon atoms, and (c) is an aliphatic carboxylic acid having 2 to 3 carboxyl groups and 2 to 8 carbon atoms, and wherein compound (1) and compound (2) are in a ratio from 20:70 to 10:90.

2. Rumen bypass formulation according to claim 1 wherein the biologically active substance is selected from the group consisting of amino acids, hydroxy homologous of amino acids, vitamins, saccharides, and veterinary medicines.

3. Rumen bypass formulation according to claim 2, wherein the amino acid is selected from the group consisting of methionine and lysine hydrochloride.

4. Rumen bypass formulation according to claim 1 wherein compound (2) is a calcium salt.

5. Rumen bypass formulation according to claim 1 wherein component (a) is a saturated or unsaturated straight-chain or branched-chain aliphatic monocarboxylic acid selected from the group consisting of lauric acid, palmitic acid, palmitoleic acid, myristic acid, stearic acid, oleic acid, and linoleic acid.

6. Rumen bypass formulation according to claim 4 wherein the calcium is present at a concentration of 7 to 12% by weight.

7. Rumen bypass formulation according to claim 4 wherein the formulation consists of at least 90% of the salt.

8. Rumen bypass formulation according to claim 2 wherein the biologically active substance is amino acid.

9. Rumen bypass formulation according to claim 2 wherein the biologically active substance is a hydroxy homologue of amino acid.

10. Rumen bypass formulation according to claim 9 wherein the hydroxy homologue of amino acid is selected from the group consisting of 2-hydroxy-4-methylmercapto-butyric acid and a salt thereof.

* * * * *

UNITED STATES PATENT AND TRADEMARK OFFICE
CERTIFICATE OF CORRECTION

PATENT NO. : 5,776,483
DATED : July 7, 1998
INVENTOR(S) : Morikawa, et al.

It is certified that error appears in the above-identified patent and that said Letters Patent is hereby corrected as shown below:

On the title page of the Patent, in the Abstract, the 4th line, the word "composted" should be "composed".

Column 12, Line 36, should read "compound (2) are in a ratio from 30:70 to 10:90."

Signed and Sealed this

Twentieth Day of October, 1998

Attest:

BRUCE LEHMAN

*Attesting Officer*            *Commissioner of Patents and Trademarks*